United States Patent [19]

Grant

[11] E Re. 30,968

[45] Reissued Jun. 15, 1982

[54] ATTACHMENT FOR PAINT SPRAY GUN SYSTEMS

[75] Inventor: Colonel E. Grant, Toledo, Ohio

[73] Assignee: Champion Spark Plug Company, Toledo, Ohio

[21] Appl. No.: 60,822

[22] Filed: Sep. 24, 1979

Related U.S. Patent Documents

Reissue of:

[64] Patent No.: 3,990,609
Issued: Nov. 9, 1976
Appl. No.: 666,192
Filed: Mar. 12, 1976

[51] Int. Cl.[3] ..... B05B 1/28
[52] U.S. Cl. ..... 222/111
[58] Field of Search ..... 222/111, 193, 181, 109, 222/635; 239/121, 122; 220/324

[56] References Cited

U.S. PATENT DOCUMENTS

| | | | |
|---|---|---|---|
| 177,470 | 5/1876 | Chadwick | 222/111 |
| 1,018,193 | 2/1912 | Hinkle | 239/121 X |
| 1,888,330 | 11/1932 | Robinson | 222/111 |
| 3,240,398 | 3/1966 | Dalton, Jr. | 222/193 |
| 3,401,842 | 9/1968 | Morrison | 222/181 |
| 3,858,810 | 1/1975 | Seeley et al. | 239/121 |
| 3,942,680 | 3/1976 | Seeley et al. | 220/324 |

*Primary Examiner*—Stanley H. Tollberg
*Attorney, Agent, or Firm*—Richard D. Emch

[57] ABSTRACT

A spill preventing diaphragm attachment for a paint spray gun paint cup as shown. The diaphragm is engaged around the mouth of the paint cup and forms, with the undersurface of the paint cup lid, a chamber above the paint in the cup that is deeper at one side than the other. At the deep side, oriented 180° away from the vent opening in the lid is a vent opening in the diaphragm. Any paint that might flow through the diaphragm vent opening as a result of tipping the spray gun drains back into the cup as soon as the gun is righted. The diaphragm is readily replaceable without tools.

3 Claims, 4 Drawing Figures

ATTACHMENT FOR PAINT SPRAY GUN SYSTEMS

Matter enclosed in heavy brackets [ ] appears in the original patent but forms no part of this reissue specification; matter printed in italics indicates the additions made by reissue.

BACKGROUND OF THE INVENTION

The invention relates to an attachment for the paint cup of a well-known type of spray painting apparatus. The paint cup is secured to a spray gun and flow of pressurized air through or about the gun nozzle creates a partial vacuum at the fluid discharge orifice of the spray gun. Atmospheric pressure entering a vent opening in the lid of the paint cup acting upon the contents of the paint cup causes the paint to flow through a delivery tube to the fluid discharge orifice of the spray gun nozzle. The delivery tube is mounted on the lid or cover for the cup and is removable therewith, and the inner end of the delivery conduit extends to the bottom of the cup, usually adjacent the front wall thereof. The vent opening is normally formed in the lid or cover near an edge thereof as, for example, at the side.

The existence of the vent opening has in the past given rise to the danger of leakage through the opening onto the lid or cap, which in turn often dripped on the operator or the target, creating an undesirable condition which requires constant attention on the part of the operator. As the level of liquid in the paint cup is reduced the tendency to leak is, of course, also reduced so that many operators will only partially fill the cup thus effectively reducing the capacity of the system and requiring more frequent filling than usual.

It has been proposed to overcome the above disadvantages and to provide a system wherein leakage through the vent opening does not occur. This has been achieved by using a conduit or pipe threaded into the lid and effectively extending the vent opening so that the outer end of the vent opening is accessible to the interior of the paint cup through a trapped column of air even if the inner end of the conduit is below the liquid level. If the inner end of the conduit is above the liquid level, there will of course be no leakage. The pipe or conduit is arranged so that a column of air must be trapped before liquid can flow through the outer end of the vent opening. In use, the operator must return the cup to its upright position so that the conduit is above the liquid level. The foregoing is shown and described in the patent to Dalton Jr. U.S. Pat. No. 3,240,398.

BRIEF DESCRIPTION OF THE INVENTION

The present invention provides a simple diaphragm as an attachment to a paint cup which is forced in place over the conventional delivery tube and around the locknut that holds the delivery tube in assembled relation to the cap or cover for the paint cup. It is not necessary to drill any parts or replace any of the normal cap elements. The simple diaphragm that is installed is engaged by the lid of the paint cup at its periphery. With the diaphragm installed the spray gun may be tilted downwardly or upwardly or from side-to-side and normal spraying will still take place without spilling paint from the cup onto the surfaces of the lid or cover. The diaphragm attachment may be made to fit existing spray guns.

DETAILED DESCRIPTION OF THE DRAWINGS

Figure 1:
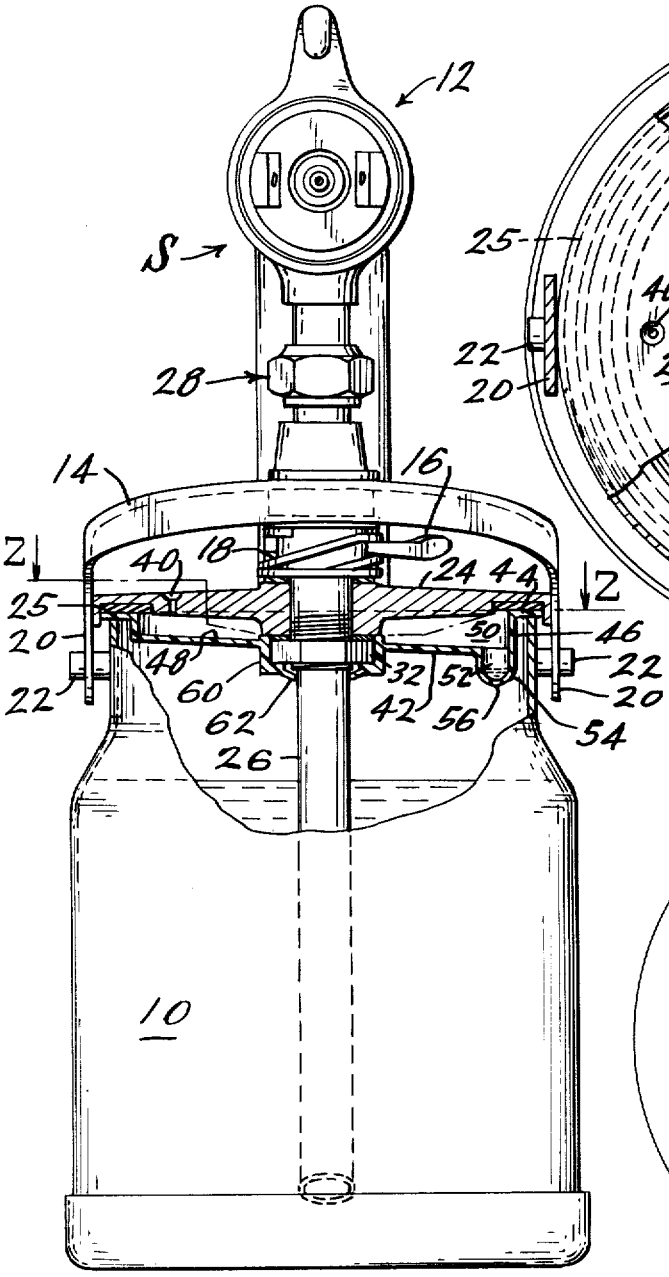
FIG. 1 is a front elevational view of a spray gun and paint cup in assembled relation with parts shown in section indicating the installation of the attachment of the present invention.
Figure 2:
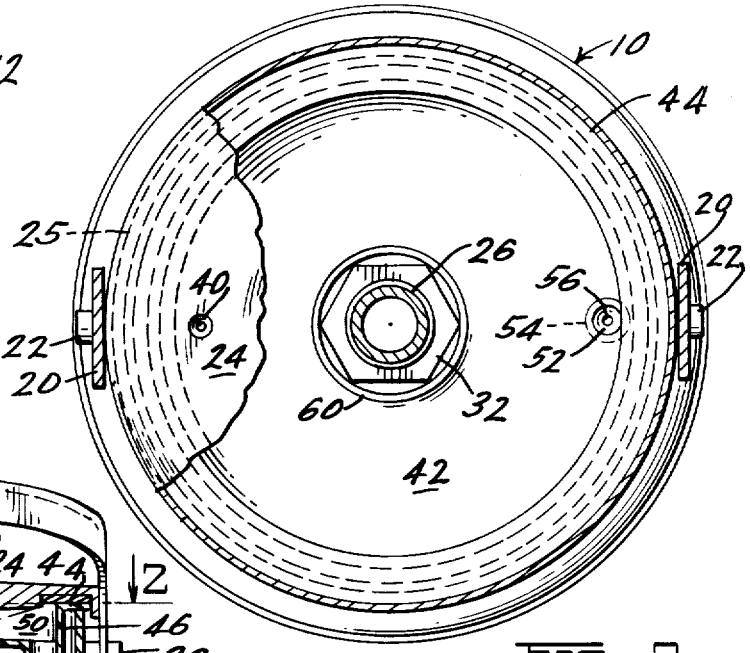
FIG. 2 is a section on line 2—2 of FIG. 1.
Figure 3:
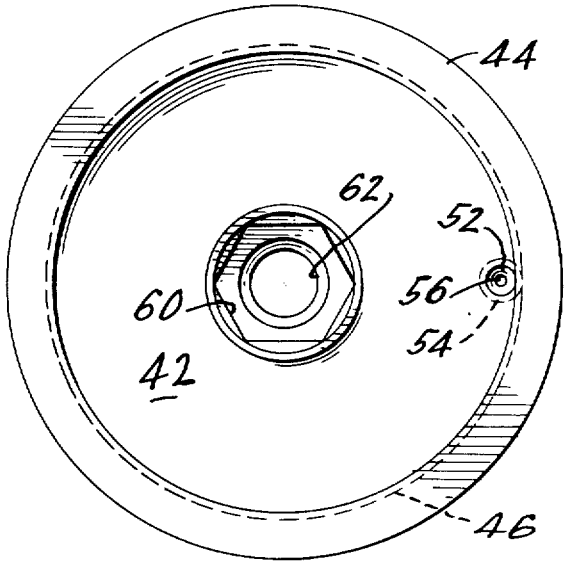
FIG. 3 is a top plan view of a diaphragm attachment of the present invention adapted to be placed over the locknut of a conventional apparatus.
Figure 4:
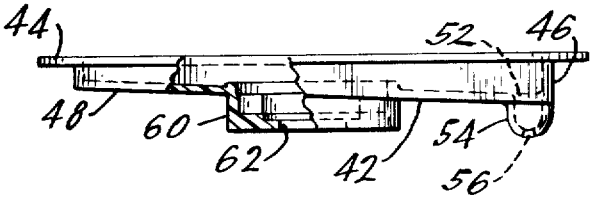
FIG. 4 is a side elevational view, with parts broken away, of the diaphragm attachment of the present invention.

In the drawings, 10 designates a conventional paint cup typically having a capacity of one quart, and a full line 1-11/16 inches below the lip of the cup. The cup is held into assembled relation to a spray gun 12 by a quick disconnect yoke 14 and a hold-down lever 16 having a conventional cam 18 which urges the yoke 14 upwardly. The yoke 14 has depending arms 20 which engage trunnions 22 extending from the cup. The cam 18 works between the web of the yoke 14 and the upper surface of a lid or cover 24 which closes off the top of the paint cup after the latter has been filled. Usually, a gasket 25 is recessed into the undersurface of the lid or cover where engagement with the lip of the paint cup 10 takes place to prevent leakage at this point.

A delivery tube 26 extends from a point near the bottom of the cup, usually adjacent the front wall thereof and is inserted into the cover 24. A fitting 28 attaches to the spray gun indicated generally at S in a known manner. The assembly is made with the delivery tube 26 underlying the spray gun so that the gun sprays in the direction of the displacement of the tube from the center of the bottom of the cup 10.

The delivery tube assembly, having been inserted into the cap or cover is held in place by a locknut 32 which bears against the underside of the lid. The lid 24 has a vent opening 40 in one side thereof at a point underlying the web of the attachment yoke 14.

The attachment of the present invention comprises a diaphragm 42 which includes an outwardly extending peripheral flange or lip 44 secured, in use, between the gasket 25 and the peripheral upper surface of the paint cup. Inwardly from the outwardly extending peripheral flange 44 the diaphragm 42 has a vertical portion 46 connected to the main central portion 48, and the main central portion 48 slants from one side to the other. Under the vent opening 40 the diaphragm is quite closely spaced with relation to the undersurface of the cap while at the opposite side the slanting configuration of the diaphragm 42 brings the surface of the diaphragm well away from the undersurface of the cover and forms a chamber 50 which is thus deeper at one side than at the other. At the deep side of the chamber 50, a small drain chamber 52 is provided in the form of a hemispherical dimple 54. A vent opening 56 extends through the bottom of the dimple 54 and the diaphragm is assembled to bring this vent opening 56 180° away from the vent opening 40. The normal vent path for air entering the paint cup 10 during spraying is through the vent opening 40, through the interior of the chamber 50 and the venting opening 56. The inclination of the diaphragm allows any paint that is trapped in the cavity between it and the lid to quickly drain back into the paint cup 10 when the cup is returned to the normal vertical position.

It will be seen that there is no direct access from the interior of the paint cup 10 to the vent opening 40. The opening 40 is thus spill-proof. In use it has been found that with a full paint cup the second vent opening 56 may be immersed in paint if the operator so tilts the spray gun from one side to another but that spraying will continue in spite of this immersion. Air entering the spray gun simply bubbles through the paint from the vent opening 56. At its center the diaphragm 42 is molded or formed with an integral boss 60 which is of the same size and shape as the locknut 32 which holds the delivery tube in place on the cover 24. The diaphragm may thus be mounted in place below the cover merely by sliding it up the delivery tube 26 until a diaphragm boss 64 contacts the underside of lid 24. The inner diameter of the opening 62 below the boss 60 which surrounds the delivery tube is purposely made small so that the material of the diaphragm boss is slightly distorted as the diaphragm is forced over the delivery tube and its locknut. There is thus a liquid-tight seal at this point.

In operation, the paint cup is filled in the usual maner. The diaphragm 42 is run upwardly over the delivery tube 26 until the integral boss 64 contacts the bottom of the lid 24. At this time the peripheral flange 44 will have engaged under the cover gasket 25. The diaphragm 42 is oriented in such a manner that the dimple or well 52 is at the side of the lid or cover opposite the vent hole 40. The cover or lid may then be assembled onto the paint cup in the usual manner.

If the operator tilts the spray gun in any direction there will be no leakage through the vent opening 40. A small quantity of paint may enter into the chamber 50 if the diaphragm vent opening 56 is immersed in the paint by reason of the operator tilting the entire system including the spray gun in a clockwise direction in FIG. 1. Spraying will continue, however, but no paint will spill out of the opening 40 because this opening is always higher than the paint level in any except an inverted position of the paint cup. Assuming that some paint enters the chamber 50 through the vent opening 56 it will be immediately sucked back into the paint cup when the cup and gun are restored to a vertical position and spraying resumed. In order to clean the diaphragm if such should ever become necessary it is only required that the operator pull the diaphragm away from the locknut and clean its upper surface. In many cases the diaphragm can be cleaned in place by simply putting solvent in the cup, replacing the lid and sloshing it around. The diaphragm can be replaced since the element is quite inexpensive.

What I claim is:

1. An attachment for a spray painting apparatus comprising a spray gun and an open-mouth paint cup, a lid seated on said paint cup to close the same with a peripheral seal against leakage, said lid having a vent opening therein, a delivery tube extending from the lower side of said paint cup to said spray gun, means to attach said delivery tube to said lid for removal therewith, *said attaching means including a locknut;* said attachment consisting of a diaphragm having a peripheral flange for engagement between the peripheral seal of said lid and said paint cup, a downwardly extending wall inwardly of said flange and of progressively increasing length forming with said diaphragm a chamber that is deeper at one side than at the opposite side, said deeper side being oriented away from the vent opening in said lid and having a second vent opening in the lower surface thereof, and means in the center portion of said diaphragm to engage said delivery tube and delivery tube [retaining] *attaching* means in a substantially liquid-tight connection *said engaging means including a formed boss which mates with said locknut for maintaining said diaphragm second vent opening in a spaced relationship to said lid vent opening.*

2. An attachment in accordance with claim 1 in which the vent opening in the deeper portion of said diaphragm is oriented on the opposite side from the vent opening in said lid.

3. An attachment in accordance with claim 1 in which said peripheral diaphragm flange forms the seal between said lid and said cup.

* * * * *